(12) United States Patent
Van Neerbos

(10) Patent No.: US 9,551,407 B2
(45) Date of Patent: Jan. 24, 2017

(54) TRANSMISSION

(71) Applicant: Hydrautrans B.V., Enschede (NL)

(72) Inventor: Bart Richard Van Neerbos, Loosdrecht (NL)

(73) Assignee: HYDRAUTRANS BV, Enschede (NL)

( * ) Notice: Subject to any disclaimer, the term of this patent is extended or adjusted under 35 U.S.C. 154(b) by 0 days.

(21) Appl. No.: 14/371,316

(22) PCT Filed: Jan. 10, 2013

(86) PCT No.: PCT/EP2013/050369
§ 371 (c)(1),
(2) Date: Jul. 9, 2014

(87) PCT Pub. No.: WO2013/104694
PCT Pub. Date: Jul. 18, 2013

(65) Prior Publication Data
US 2015/0051038 A1   Feb. 19, 2015

(30) Foreign Application Priority Data

Jan. 11, 2012  (NL) .................................... 2008103

(51) Int. Cl.
*F16H 47/04*   (2006.01)
*F16H 47/02*   (2006.01)
*H02K 7/116*   (2006.01)

(52) U.S. Cl.
CPC ............... *F16H 47/04* (2013.01); *F03D 15/00* (2016.05); *F03D 80/70* (2016.05); *F03D 80/88* (2016.05);
(Continued)

(58) Field of Classification Search
None
See application file for complete search history.

(56) References Cited

U.S. PATENT DOCUMENTS 4,206,608 A * 6/1980 Bell ................................ 60/698
6,911,743 B2 * 6/2005 Ishizaki .......................... 290/55
(Continued)

FOREIGN PATENT DOCUMENTS

EP         2354544        8/2011
GB         2496289 A  * 10/2012   ............... F03D 7/06
(Continued)

OTHER PUBLICATIONS

International Search Report and Written Opinion of corresponding foreign application PCT/EP2013/050369, filed Jan. 10, 2013.
(Continued)

*Primary Examiner* — Dirk Wright
(74) *Attorney, Agent, or Firm* — Steven M. Koehler; Westman, Champlin & Koehler, P.A.

(57) ABSTRACT

The invention concerns a transmission mounted in a housing between a turbine and a generator on top of a tower of a wind turbine, comprising a gearbox and in the gearbox a main gear mounted on a main gear shaft and a pinion that engages a set of gear teeth of the main gear. The pinion is mounted on a pinion shaft and the pinion shaft is coupled to a hydraulic pump mounted on the gearbox, a hydraulic motor drives the generator. In accordance with the invention the main gear shaft and the rotor shaft together form a common shaft and a main gear shaft bearing is mounted between the common shaft and the gearbox and at least two tension bars prevent the rotation of the gearbox and leave the gearbox free to move in linear directions.

14 Claims, 3 Drawing Sheets

(52) U.S. Cl.
CPC .............. *F16H 47/02* (2013.01); *H02K 7/116* (2013.01); *F05B 2240/54* (2013.01); *F05B 2260/406* (2013.01); *F05B 2260/4031* (2013.01); *F16H 2047/045* (2013.01); *Y02E 10/721* (2013.01); *Y02E 10/722* (2013.01)

(56) References Cited

U.S. PATENT DOCUMENTS

| | | | |
|---|---|---|---|
| 7,861,827 B2 * | 1/2011 | Madge et al. | 184/6.12 |
| 8,075,442 B2 * | 12/2011 | Ciszak et al. | 475/331 |
| 8,426,998 B2 * | 4/2013 | Lu | 290/54 |
| 8,492,918 B1 * | 7/2013 | Kamenov | 290/43 |
| 2010/0032959 A1 * | 2/2010 | Nies | 290/55 |
| 2010/0270809 A1 * | 10/2010 | Dahlhaug | 290/55 |
| 2011/0109094 A1 * | 5/2011 | Kenway et al. | 290/55 |
| 2012/0161442 A1 * | 6/2012 | Chapple | 290/44 |
| 2013/0095972 A1 * | 4/2013 | Dinter et al. | 475/149 |
| 2014/0246792 A1 * | 9/2014 | Pavlov | 261/31 |

FOREIGN PATENT DOCUMENTS

| | | |
|---|---|---|
| JP | 2003278640 A | 10/2003 |
| WO | 2011011682 | 1/2011 |

OTHER PUBLICATIONS

Manwell et al: "Wind energy explained" In: "Wind energy explained", Dec. 30, 2009, John Wiley & Sons Ltd.
Copy of Office Action for corresponding Jp Patent Application No. 20020079725 20020320, dated Oct. 31, 2016, 10 pp.. 0.

* cited by examiner

TRANSMISSION

CROSS-REFERENCE TO RELATED APPLICATION

This application is a Section 371 National Stage Application of International Application PCT/EP2013/050369 filed Jan. 10, 2013 and published as WO 2013/104694 A1 in English.

BACKGROUND

The discussion below is merely provided for general background information and is not intended to be used as an aid in determining the scope of the claimed subject matter.

Aspects of the invention concerns a transmission mounted in a housing between a turbine and a generator on top of a tower of a wind turbine known wind turbine drive systems include an input gear train connectable to the drive shaft rotated by wind energy, and a plurality of hydraulic circuits interposed between the input gear train and the generator. The input gear train is part of a gearbox.

The known gearboxes support the bearings for the gears and the housing supports the gearbox. In situations where dimensions increase such as the length of the blades also the dimensions of the rotor bearing and the main gear increase and the rotation speed of the blades decreases. Due to the increasing dimensions, the conventional solutions for supporting the rotor shaft with two bearings located at some distance are no longer desirable as they lead to complicated solutions for the foundation of bearings in order to prevent undesirable changes in dimensions due difference in temperature in various components and at various positions in the housing.

In order to avoid the complicated solutions in the known designs a single bearing supports the rotor shaft. However in the known designs dimensional deviations of the desired dimensions and/or deformations as a result of the high loads still occur in the gearbox and this leads to undesirable risk in the construction of the gearbox.

SUMMARY

This Summary and the Abstract herein are provided to introduce a selection of Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an aspect of the invention the forces on the gearbox aside from the gravitational forces are limited to a torque between the main gear shaft and the rotor shaft. Fixing the position of the gearbox with regard to the position of the main gear by the use of the main gear shaft bearing avoids that deformations, oscillations or any other unintended movement of the housing or the rotor main bearing influence the tooth engagement of the main gear with the pinion and avoids additional loads on the gears. The forces between the main gear and the pin-ion remain in the gearbox and the torque on the pinion is transferred into hydraulic pressure leaving no further torque or force. The tension bars lead the torque on the main gear back into the housing without any resulting linear force on the gearbox. This avoids any deformation in the gearbox that might influence the functioning of the gears.

In accordance with an embodiment, the main gear has two sets of gear teeth on opposite sides of a gear body that is connected to the main gear shaft and each set of gear teeth cooperates with a pinion that has the same dimension; two pinions might be opposite each other on opposite sides of the gear body. In this way, the main gear can transmit a considerably higher torque and at the same time the teeth forces on the first set of gear teeth is equal to the forces on the second set of gear teeth but in the opposite direction, so that only a resulting torque remains and there is no resulting load on the bearing that supports the main gear. The teeth forces keep the main gear between the pinions and these forces counteract each other via the pinion bearings in the gearbox, and the pinion bearing are located near each other so that deformations are negligible. This improves the accuracy of the interaction between the main gear and the pinions.

In accordance with an embodiment, each set of gear teeth engages two or more pinions that are equally spaced around a circumference of the set of gear teeth. In this way, the number of pinions is increased and the forces between the pinions and the main gear are distributed evenly around the circum- ference of the main gear so that there is no remaining load on the main gear bearing. The pinions exert the pinion force equally spaced around the main gear so that these forces do not result in bending forces on the gear-box and bending or deformations of the main gear and the gearbox are avoided.

In accordance with an embodiment, the main gear, the main gear shaft, and the gearbox are ring shaped. In this way, there is an opening in the center of the gearbox, so that maintenance per-sonal can access to and from the rotor and whereby the pumps might be in the center so reducing space requirement.

In accordance with an embodiment, a first seal is mounted in the gearbox and a second seal is mounted on the main gear shaft. In this way, the oil seals are each in an outer circumference enclosing a surface, so that a spring element surrounding the surface ensures proper functioning of the seals.

In accordance with an embodiment, the main gear is a cylindrical gear that has a set of gear teeth at the outer circumference and a set of gear teeth at the inner circumference, and the rotation axes of the main gear and the pinions are parallel. In this way, the large diameter main gear has gear teeth on the inside and the outside of a bush that forms the gear body. The main gear can move in the gearbox in the direction of the rotation axis relative the pinions. The number of teeth on the inside and outside of the main gear might be different, so that the pumps might have different rotation speeds. As the pumps are at the large circumference of the gearbox, it is possible to increase the number of pumps and pinions for instance to six or eight.

In accordance with an embodiment, the main gear has conical teeth at both sides of the gear body, the pinions are conical gears and the rotation axes of the pinions make an angle with or are perpendicular to the rotation axis of the main gear. In this way, the main gear and the pinions have to be positioned accurately in both direction of the rotation axes of the main gear and the pinions. The gears then transmit a high load in an effec- tive way and the pumps can be within the gearbox thereby reducing the dimensions of the housing.

In accordance with an embodiment, each set of gear teeth of the main gear forms a crown gear at one side of the gear body, the pinions are cylindrical gears and the rotation axes of the pinions are perpendicular to the rotation axis of the main gear or can make an angle. In this way, the main gear positions itself between the pinions and the pinions can move in the axial direction of the pinion axis without disturbing the setting. The pumps can be within the gearbox thereby reducing the dimensions of the housing In accordance with an embodiment, the pinions have helical teeth. In this way, the gear teeth of the pinion (s) are longer in engagement with the main gear so that the transmitted load can be higher and the gears run more smoothly.

In accordance with an embodiment, the pumps are enclosed by the ring shaped gearbox. In this way, the pumps are easy to access and the dimension of the housing can be limited to the maximum dimension of the rotor bearing.

In accordance with an embodiment, the number of teeth of a set of teeth of the main gear is at least five times and possibly at least ten times the number of teeth of the pinion(s). In this way, the pumps get a higher rotation speed and the pumps can have a smaller stroke volume and thus are smaller while getting the same capacity.

In accordance with an embodiment, a high-pressure accumulator connects to the high-pressure line and a low-pressure accumulator connects to the low-pressure line. In this way, irregularities in the oil flow from the pumps to the hydraulic motor are dampened and do not disturb the rotation of the generator.

In accordance with an embodiment, a valve configured to swap connections of the ports of at least one pump to the high-pressure line and the low-pressure line so that the pinion connected to this pump exerts a counterforce on the main gear. In this way, at least one pinion exerts a load on the main gear in an opposite direction and so causes a load between the all pinions and the main gear. This prevents that in the situation where the rotor is at a standstill and might oscillate backwards that the tooth faces collide and that these collisions lead to damage of the tooth faces. The teeth remain under pre-tension and damage as a result of repeatedly collisions of the tooth faces is avoided.

BRIEF DESCRIPTION OF THE DRAWINGS

Hereafter aspects of the invention is elucidated with the aid of some embodiments using a drawing.

In the drawing

DETAILED DESCRIPTION OF ILLUSTRATIVE EMBODIMENTS

Figure 1:
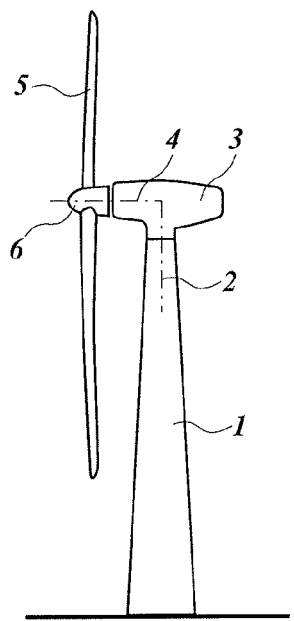
FIG. 1 shows a side view of a wind turbine.

FIG. 1 shows a nacelle 3 mounted on a tower 1. The hub 6 is mounted in the nacelle 3 and the hub 6 can rotate around the blade shaft 4. The blades 5 are attached to the hub 6. The nacelle 3 can rotate around a yaw shaft 2 so that the blade shaft 4 can be directed to the prevailing wind direction. For generating electricity from wind the size of the device appears to be most important for the economic efficiency and big wind turbines with long blades are more suitable for efficient generation. Due to a natural limit to the maximum speed of the tip of a blade 5 when moving through air, the rotation speed of the turbine is lower with increasing blade length. For wind turbines with blade lengths of 30 to 80 meter the rotation speed of the hub 6 is limited to between 10 to 25 revolutions per minute.

A generator 16 is located in the nacelle 3 (see FIGS. 2 and 3) for generating electricity. The generator 16 is suitable for transferring power generated by the blades 5 into electricity and rotates with a maximum ro-tation speed of 1500 revolutions per minute, so that the dimensions of the generator 16 are limited. In some cases the generator 16 is suitable for a maximum rotation speed of 3,000 revolutions per minute. This means that the transmission between the generator 16 and the hub 6 has a transmission ratio between 60 and 150.

Figure 2:
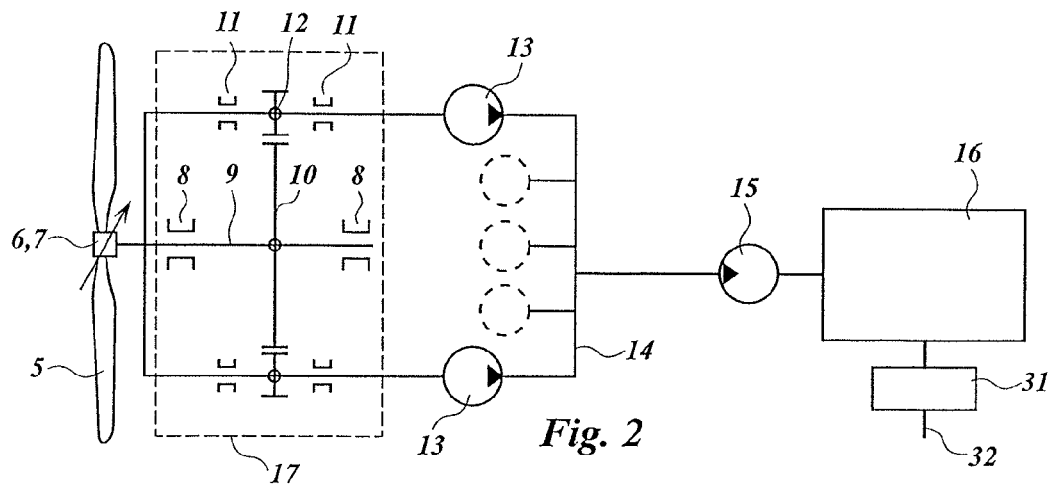
FIG. 2 shows a schematic view of a first embodiment of a transmission between the blades of the wind turbine and an electricity generator.

FIG. 2 shows schematically an embodiment of the transmission between the generator 16 and the hub 6. In the hub 6 is a blade adjusting device 7 for adjusting the pitch angle of the blades 5. The hub 6 is coupled to a first shaft 9 that is supported in bearings 8. The bearings 8 are mounted in a gearbox 17. A cylindrical gear 10 is mounted on the first shaft 9. In the gearbox 17 are five pinions 12 that are supported in bearings 11. The pinions 12 are in engagement with the gear 10, the gear 10 has between five to ten times the number of teeth as a pinion 12. In the shown embodiment the hub 6 and the gear 10 have a common shaft 9. In another embodiment, the hub 6 and the gear 10 have separate shafts that are aligned and that may be coupled by a coupling.

A pump 13 is coupled to each pinion 12 and a line 14 connects the pumps 13 to a hydro motor 15. The hydro motor 15 drives the generator 16. The stroke volume of the hydro motor 15 is smaller than the stroke volume of a pump 13 that can be 2.5 dm$^3$ while the stroke volume of the hydro motor is for instance 1 dm$^3$. In this way, the transmission ratio between the rotation speed of the five pumps 13 and the hydro motor 15 is 12.5.

Figure 3:
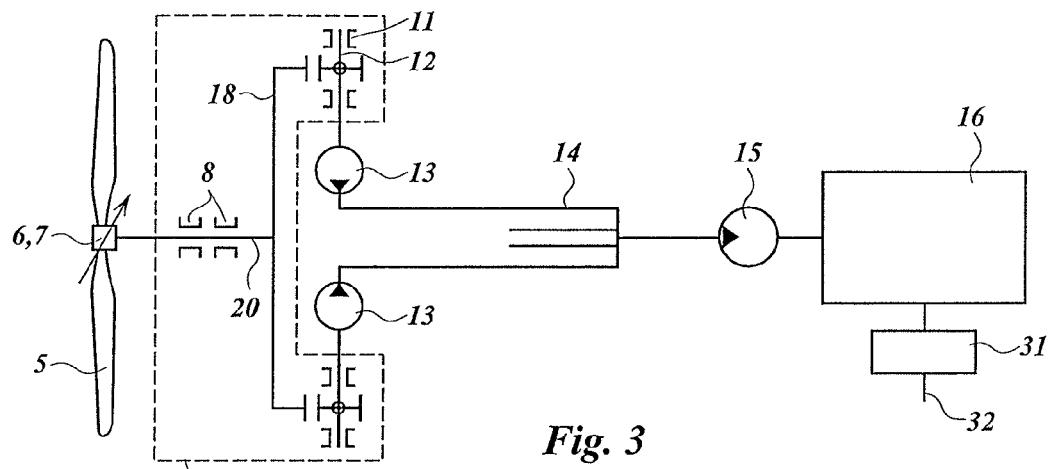
FIG. 3 shows a schematic view of a second embodiment of a transmission between the blades of the wind turbine and an electricity generator.

FIG. 3 shows an embodiment that is comparable with the embodiment in accordance with FIG. 2 and wherein the shafts of the pinions 12 are perpendicular to a shaft of a crown gear 18. The shafts of the pinion 12 are directed to the center of a gearbox 19 so that the pumps are located inside the circumference of the gearbox 19. In the shown embodiment the crown gear 18 has a shaft 20 and the crown gear 18 has a one-side bearing. In a further embodiment, the bearings of the crown gear 18 have a diameter that is comparable to the diameter of the teeth-ing of the crown gear 18 and the hub 6, and the gearbox 19 are ring-shaped whereby the pumps 13 are located at the inner side of the ring.

Figure 4:
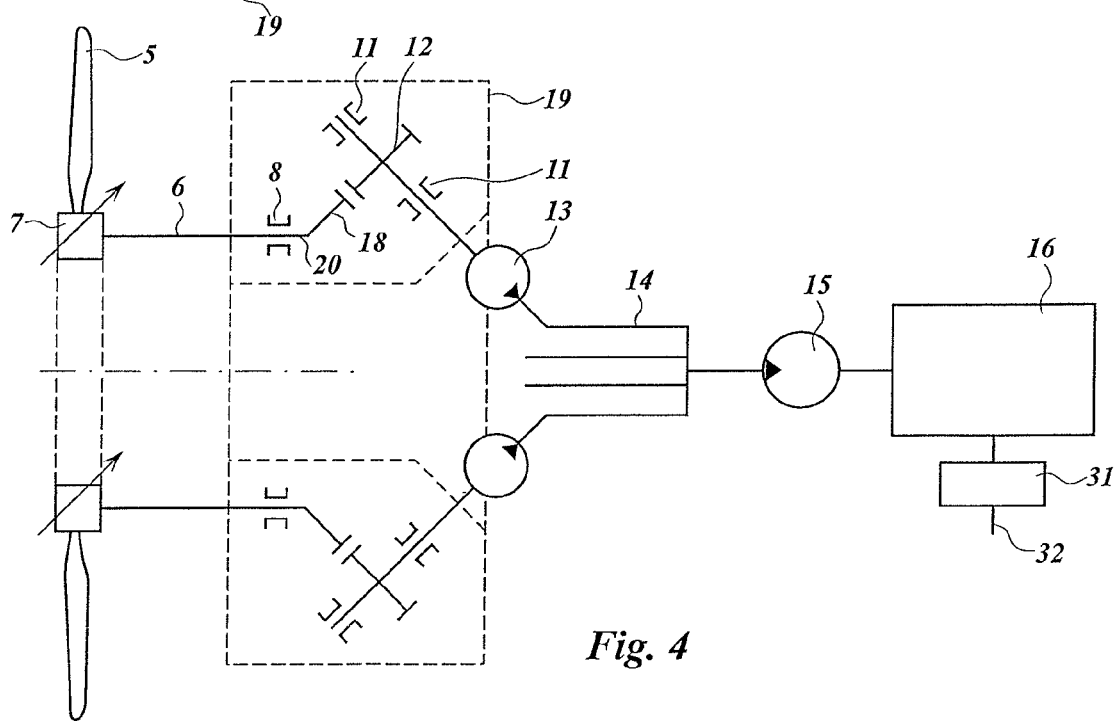
FIG. 4 shows a schematic view of a third embodiment of a transmission between the blades of a wind turbine and an electricity generator.

FIG. 4 shows a third embodiment that is comparable to the embodiment of FIG. 2 or 3. In the embodiment of FIG. 4 a crown gear 18 is on a ring-shaped hollow shaft 20 supported by a bearing 8, the bearing 8 also serves as bearing for the hollow shaft of hub 6. The gearbox 19 is shaped like a hollow ring. The rotation axes of the pinions 12 make an angle with the rotation axis of shaft 20 and in the shown embodiment the pumps 13 are located at the inner side of gearbox 19.

Figure 5:
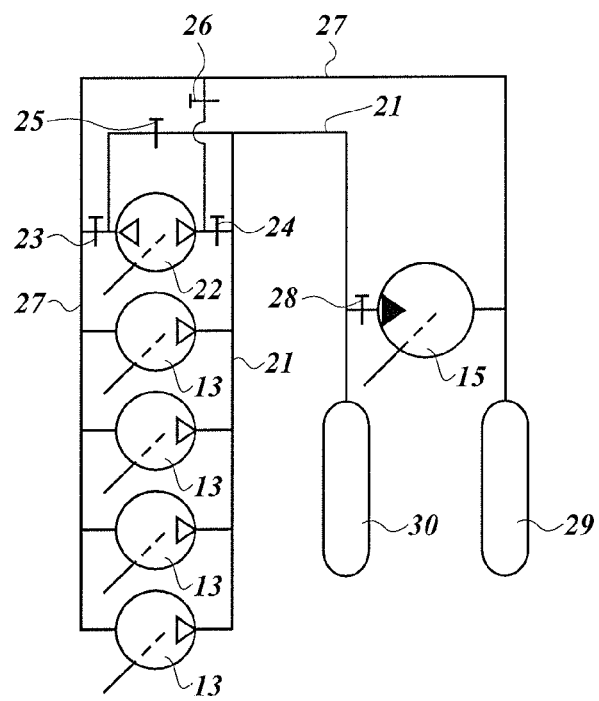
FIG. 5 shows a schematic view of the hydraulic diagram of the transmission between the blades and the electricity generator.

FIG. 5 shows a simplified hydraulic diagram that shows the connection between the pumps 13 and the hydro motor 15. One of the pumps is designed as a pump/motor 22. A high-pressure line 21 connects the high pressure side of the hydro motor 15, the pumps 13, and a high pressure accumulator 30. A low-pressure line 27 connects the low-pressure side of the hydro motor 15, the pumps 13, and a low pressure accumulator 29. Via valves 23 and 25 a first inlet of the pump/motor 22 can be connected to either the low-pressure line 27 or the high-pressure line 21. Via valves 24 and 26 a second inlet of pump/motor 22 can be connected to either the low-pressure line 27 or the high-pressure line 21. A valve 28 closes the oil flow through the hydro motor 15.

A control system (not shown) controls valves 23, 24, 25, 26, and 28. During normal use the valves 23, 24 25, and 26 are set so that the pump/motor 22 is activated as a standard pump. In the situation that the wind is calm, the valve 28 blocks the rotation of the hydro motor 15, while the pressure difference between the high-pressure accumulator 30 and the low-pressure accumulator 29 re-mains. The valves 23, 24, 25, and 26 are set so that the pump/motor 22 is activated as a motor and causes a tooth force between the pinions 12 and the gear 10 or the crown gear 18. In this way tooth play between the gears is prevented which also means that there is no colliding of the gear flanks. This improves the durability of the gear flanks The embodiments show a wind turbine with a horizontal rotation axis for the blades. Wind turbines with a vertical rotation axis are also known. The shown embodi-ments as described in the figures can be adapted and used for transferring the low rotation speed of the blades to the high rotation speed of the generator.

The embodiments show a transmission between the rotation axis of the blades and the shaft of the generator to have a fixed value. It will be clear that isolating one or more pumps from the oil flow between the pumps and the hydro motor leads to a change in the transmission ratio so that it fits better to an occurring situation. A converter 31 between the generator 16 and a grid connection 32 transforms the frequency of the AC-current generated in the generator 16 to the desired frequency of the grid connection 32.

Figure 6:
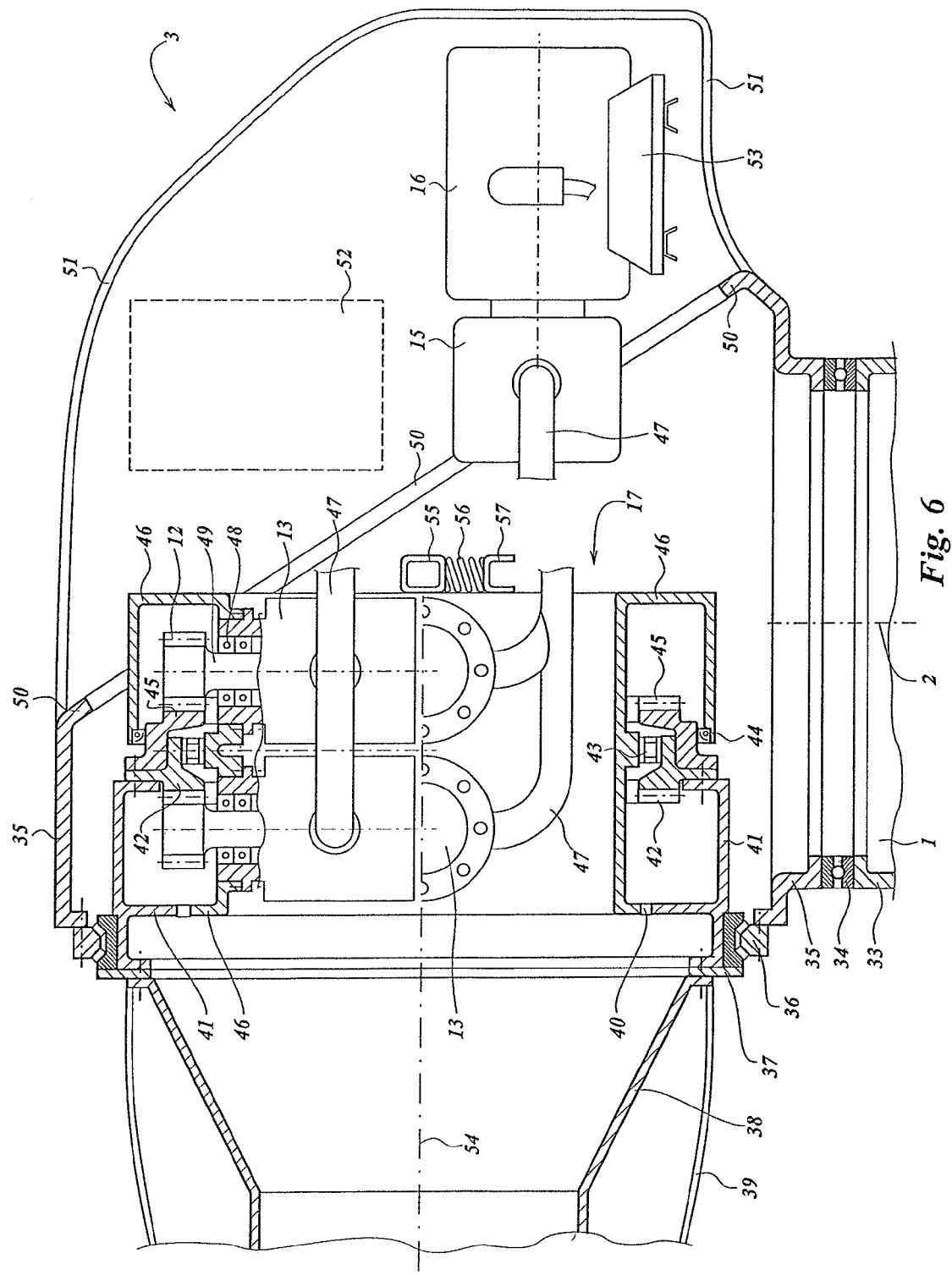
FIG. 6 shows a schematic section view of an embodiment of a housing with a gearbox.

FIG. 6 shows a schematic cross section of an embodiment of nacelle 3 with the gearbox 17 with two sets of pumps 13 at diametrically opposite sides of the gearbox 17. In FIG. 6 the top half of the gearbox 17 shows a first section through the rotation axes the two pinions 12. In FIG. 6 the bottom half of the gearbox 17 shows a second cross section perpendicular to the first cross section with a view of the pumps 13.

The top of the tower 1 has a top flange 33. On the top flange 33 is a yaw bearing 34 that supports a housing 35 whereby the housing 35 can rotate around the yaw axis 2. The housing 35 is a structural part of the nacelle 3 and it supports a rotor bearing 36 with an approximately horizontal rotor rotation axis 54. The housing 36 has a reinforcement flange 50 and other reinforcements that en-sure that the rotor bearing 36 has sufficient resistance against deformation under load.

The rotor bearing 36 has seals (not shown) to ensure proper lubrication of the bearing and around the outside circumference of the rotor bearing 36 are covers (not shown) that ensure protection of the rotor bearing 36 and its seals against the ambient surroundings. A housing cover 51 is attached to the housing 35 to create a room in which the generator 16 is located; the room has a floor and girders, cooling and/or oil tanks, an oil cooler and other facilities for functioning of the installation. The room also contains a control system 52 to control the various components.

The rotor bearing 36 supports a hub shaft 38, and a main gear shaft 41, a coupling plate 37 fixes the rotor bearing 36 on the main gear shaft 41. A first crown gear 42 and a second crown gear 45 are bolted against the main gear shaft 41. Together the hub shaft 38, the coupling plate 37, the main gear shaft 41, the first crown gear 42 and the second crown gear 45 together form a common shaft supported by the rotor bearing 36. In other embodiments for ease of assembly or other reasons the parts forming the common shaft are subdivided in further parts or are subdivided differently or parts are combined in a different way.

A main gear bearing 43 supports a gearbox housing 46 and the common shaft and in this embodiment specifically the first crown gear 42 supports the main gear bearing 43. The main gear bearing 43 might be suitable for allowing axial movement of the crown gears 42, 43 so that these gears can position themselves in axial direction. A tension bar 55 is fastened to the gearbox housing 46 and a spring 56 mounted on a bracket 57 that is fastened against the inside of the housing 35 prevents the rotation of the tension bar 5 around the rotation axis 54 and therewith prevents the rotation of the gearbox housing 46.

Between the gearbox housing 46 and the second crown gear is a seal 44 and between the gearbox housing 46 and the main gear shaft 41 is a seal 40. The seals 40 and 44 are mounted such that the sealing surface is on the inside diameter and the seals 40 and 44 can be oil seals that prevent lubrication oil to flow out of the gearbox 17.

FIG. 6 shows a pinion 12 engaged with the first crown gear 42 and a pinion 12 engaged with the second crown gear 45. A pinion shaft 49 connects the pinion 12 with the pump 13. The pump 13 has a pump housing that is coupled to the gearbox housing 46 and the pump housing supports the pinion shaft bearings 49. Oil lines 47 connect the pumps 13 and the hydro motor 15. The hydro motor 15 is coupled to the generator 16 that is mounted with a support 53 on a frame in the nacelle 3.

The embodiment of FIG. 6 shows two crown gears 42, 45 with four pumps 13 that are mounted in the central part of the gearbox 17, whereby the rotation axes of the pumps 13 are perpendicular to the rotation axis of the rotor driven crown gears, 42, 43. As indicated before instead of crown gears conical gears or a cylindrical wheel with inner teeth and outer teeth can be used and the angle between the rotor driven wheel and the pinions can have any value between 0 and 90 degrees. In the situation wherein the rotor driven wheel has only one set of gear teeth the main gear bearing 43 is suitable to absorb an axial force.

In the shown diagrams the conventional parts such as a tank, a cooling system, a high-pressure relief valve, a preload system for generation the low-pressure in the low-pressure accumulator, a warning and safety system and other protections for a hydraulic system are not shown although they will be available as needed. Also lubrication systems for bearings and gears have not been illustrated but they are implicated as required.

The invention claimed is:
1. A transmission between a rotor shaft of a turbine device and a generator in a housing on top of a tower of a wind turbine, comprising:
    a gearbox; and
    in the gearbox, a single stage gear transmission, comprising:
        a main gear mounted on a main gear shaft; and
        a plurality of pinions that each engage the main gear, each pinion being mounted on a respective pinion shaft supported by pinion shaft bearings in the gearbox,
            wherein the main gear shaft and the rotor shaft together form a common shaft,
            wherein a main gear shaft bearing is mounted between the common shaft and the gearbox, wherein the rotor shaft is supported by a rotor bearing that is mounted in the housing, and wherein a tension bar couples the gearbox to the housing, the tension bar preventing rotation of the gearbox and leaving the gearbox free to move in linear directions;

a plurality of hydraulic pumps mounted to the gearbox, wherein each respective pinion shaft is coupled to one of the hydraulic pumps; and a hydraulic motor configured to drive the generator, a high-pressure line, and a low-pressure line connected to the hydraulic motor and each of the hydraulic pumps.

2. The transmission in accordance with claim 1 wherein the main gear has two sets of gear teeth on opposite sides of a gear body that is connected to the main gear shaft and each set of gear teeth cooperates with a pinion that has the same dimension.

3. The transmission in accordance with claim 1 wherein the main gear has a set of gear teeth that engages two or more pinions that are equally spaced around a circumference of the set of gear teeth.

4. The transmission in accordance with claim 1 wherein the main gear, the main gear shaft, and the gearbox are ring shaped.

5. The transmission in accordance with claim 4 wherein a first seal is mounted in the gearbox and a second seal is mounted on the main gear shaft.

6. The transmission in accordance with claim 2 wherein the main gear is a cylindrical gear that has a set of gear teeth at an outer circumference and a set of gear teeth at an inner circumference, and rotation axes of the main gear and the pinions are parallel.

7. The transmission in accordance with claim 2 wherein the main gear has conical teeth at both sides of the gear body, the pinions are conical gears and rotation axes of the pinions make an angle with a rotation axis of the main gear.

8. The transmission in accordance with claim 2 wherein each set of gear teeth of the main gear forms a crown gear at one side of the gear body, the pinions are cylindrical gears and rotation axes of the pinions are perpendicular to a rotation axis of the main gear.

9. The transmission in accordance with claim 1 wherein the pinions have helical teeth.

10. The transmission in accordance with claim 1 wherein the pumps are enclosed by the gearbox.

11. The transmission in accordance with claim 1 wherein an amount of teeth of a set of teeth of the main gear is at least five.

12. The transmission in accordance with claim 1 wherein a high-pressure accumulator connects to the high-pressure line and a low-pressure accumulator connects to the low-pressure line.

13. The transmission in accordance with claim 12 wherein a valve is configured to swap connections of ports of pumps to the high-pressure line and the low-pressure line so that the pinion connected to the pumps exerts a counterforce on the main gear.

14. A transmission between a rotor shaft of a turbine device and a generator in a housing on top of a tower of a wind turbine, comprising:

a gearbox; and in the gearbox, a single stage gear transmission, comprising:

a main gear mounted on a main gear shaft; and a plurality of pinions that each engage the main gear, each pinion being mounted on a respective pinion shaft supported by pinion shaft bearings in the gearbox, wherein the main gear shaft and the rotor shaft together form a common shaft, wherein a main gear shaft bearing is mounted between the common shaft and the gearbox, wherein the rotor shaft is supported by a rotor bearing that is mounted in the housing, a plurality of hydraulic pumps mounted to the gearbox, wherein each respective pinion shaft is coupled to one of the hydraulic pumps; and a hydraulic motor configured to drive the generator, a high-pressure line, and a low-pressure line connected to the hydraulic motor and each of the hydraulic pumps.

* * * * *